United States Patent [19]

Brubaker

[11] Patent Number: 5,520,802
[45] Date of Patent: May 28, 1996

[54] IN-TANK FUEL FILTER FOR A LAWNMOWER

[76] Inventor: Robert L. Brubaker, 313 Scotch Pine Rd., Dillsburg, Pa. 17019-8812

[21] Appl. No.: 385,457

[22] Filed: Feb. 8, 1995

[51] Int. Cl.⁶ .................... B01D 35/027; B01D 29/37
[52] U.S. Cl. .................... 210/172; 210/448; 210/450; 210/452; 210/474; 285/92; 285/404
[58] Field of Search .................... 210/172, 448, 210/449, 450, 451, 452, 463, 474; 285/404, 92

[56] References Cited

U.S. PATENT DOCUMENTS

| | | |
|---|---|---|
| Re. 16,994 | 6/1928 | Cohn . |
| 1,155,070 | 9/1915 | Kessler . |
| 1,177,277 | 3/1916 | Schaub . |
| 1,415,217 | 5/1922 | Brock . |
| 1,451,136 | 4/1923 | Allnutt . |
| 1,553,395 | 9/1925 | Ressler . |
| 1,570,461 | 1/1926 | Cohn . |
| 1,581,947 | 4/1926 | Hobbs . |
| 1,604,048 | 10/1926 | Hobbs . |
| 1,976,975 | 10/1934 | Williams . |
| 2,351,526 | 6/1944 | Lebus . |
| 2,379,735 | 7/1945 | Meikle . |
| 2,472,307 | 6/1949 | Nagel . |
| 2,499,104 | 2/1950 | Lovell . |
| 2,524,313 | 10/1950 | Gerling . |
| 4,091,523 | 5/1978 | Riecke . |
| 4,861,478 | 8/1989 | Hall . |
| 5,312,545 | 5/1994 | Starin . |

FOREIGN PATENT DOCUMENTS 407714  12/1924  Germany .

*Primary Examiner*—Thomas M. Lithgow

[57] ABSTRACT

An in-tank fuel filter for a lawnmower including a tank inlet adapter having a lower gasket portion and an upper inlet portion, the gasket portion further having a generally tubular configuration with an outer surface, an inner surface, a top edge and a bottom edge interconnecting the surfaces thereof, the inlet portion further having a generally tubular configuration positioned in axial alignment with the gasket portion, an inner surface, an outer surface, a top edge and a bottom edge interconnecting the surfaces thereof and with the bottom edge further coupled to the top edge of the gasket portion; and a metal screen having a bottom wall and a tubular peripheral side wall portion extended upwards from the bottom wall to define a hollow interior, a central opening to the interior, and an upper edge bounding the central opening and with the upper edge coupled to the gasket portion to thereby create an annular holding space for receiving a nozzle of a gas tank.

1 Claim, 4 Drawing Sheets

IN-TANK FUEL FILTER FOR A LAWNMOWER

BACKGROUND OF THE INVENTION

1. Field of the Invention

The present invention relates to an in-tank fuel filter for a lawnmower and more particularly pertains to preventing debris from entering a fuel tank of a lawnmower with an in-tank fuel filter for a lawnmower.

2. Description of the Prior Art

The use of fuel-filters is known in the prior art. More specifically, fuel-filters heretofore devised and utilized for the purpose of preventing debris from entering a fuel system of an engine are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,911,977 to Berger discloses a filler pipe end structure, in particular for a vehicle tank. U.S. Pat. No. 4,265,752 to O'Banion discloses a self-venting gas cap. U.S. Pat. No. 4,762,247 to Temmesfeld discloses an orifice ring for a filling cap. U.S. Pat. No. 4,908,130 to Lymme discloses an automobile gasoline impurities removal apparatus. U.S. Pat. No. 5,312,545 to Stairn discloses a fuel filtering device.

While these devices fulfill their respective, particular objective and requirements, the aforementioned patents do not describe an in-tank fuel filter for a lawnmower that precludes dirt and other debris from entering a gas tank of a lawnmower or other such fuel system of a small combustion engine.

In this respect, the in-tank fuel filter for a lawnmower according to the present invention substantially departs from the conventional concepts and designs of the prior art, and in doing so provides an apparatus primarily developed for the purpose of preventing debris from entering a fuel tank of a lawnmower.

Therefore, it can be appreciated that there exists a continuing need for new and improved in-tank fuel filter for a lawnmower which can be used for preventing debris from entering a fuel tank of a lawnmower. In this regard, the present invention substantially fulfills this need.

SUMMARY OF THE INVENTION

In the view of the foregoing disadvantages inherent in the known types of fuel-filters now present in the prior art, the present invention provides an improved in-tank fuel filter for a lawnmower. As such, the general purpose of the present invention, which will be described subsequently in greater detail, is to provide a new and improved in-tank fuel filter for a lawnmower and method which has all the advantages of the prior art and none of the disadvantages.

To attain this, the present invention essentially comprises, in combination, a tank inlet adapter having a lower gasket portion and an upper inlet portion. The gasket portion has a generally tubular configuration and an outer wall with a smooth outer surface and a threaded inner surface. The outer wall includes a top edge, a bottom edge, an inner wall extended downwardly from the top edge. In addition, the gasket portion has a threaded bore radially disposed on the outer wall. The inlet portion has a generally tubular configuration positioned in axial alignment with the gasket portion, a smooth inner surface, a threaded outer surface, a top edge and a bottom edge interconnecting the surfaces thereof with the bottom edge further coupled to the top edge of the gasket portion. The inlet portion is securable to an inwardly threaded gas cap of a lawnmower. A metal screen is included and has a flat bottom wall, a tapered annular portion extended upwards from the bottom wall, and a tubular peripheral side wall portion extended upwards from the annular portion to define a hollow interior, a central opening to the interior, and an upper edge bounding the central opening. The upper edge of the screen is coupled to the gasket portion at the inner wall thereof to thereby create an annular holding space for receiving an outwardly threaded nozzle of a gas tank. The side wall portion of the screen has a fixed interior diameter. The screen has an axial length twice that of the fixed interior diameter of the side wall portion. Lastly, a threaded locking screw is included and has a handle on one end and a threaded portion on the other end. The threaded portion of the locking screw is threadedly disposed within the bore of the tank adapter and radially inwardly extendable for abutment against a threaded nozzle of a gas tank that is disposed within the holding space and is threadedly engaged with the inner surface of the gasket portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved in-tank fuel filter for a lawnmower which has all the advantages of the prior art fuel-filters and none of the disadvantages.

It is another object of the present invention to provide a new and improved in-tank fuel filter for a lawnmower which may be easily and efficiently manufactured and marketed.

It is a further object of the present invention to provide a new and improved in-tank fuel filter for a lawnmower which is of durable and reliable construction.

An even further object of the present invention is to provide a new and improved in-tank fuel filter for a lawnmower which is susceptible of a low cost of manufacture with regard to both materials and labor, and which accordingly is then susceptible of low prices of sale to the consuming public, thereby making such an in-tank fuel filter for a lawnmower economically available to the buying public.

Still yet another object of the present invention is to provide a new and improved in-tank fuel filter for a lawnmower which provides in the apparatuses and methods of the prior art some of the advantages thereof, while simultaneously overcoming some of the disadvantages normally associated therewith.

Even still another object of the present invention is to provide a new and improved in-tank fuel filter for a lawnmower for preventing debris from entering a fuel tank of a lawnmower.

Lastly, it is an object of the present invention to provide a new and improved in-tank fuel filter for a lawnmower comprising a tank inlet adapter having a lower gasket portion and an upper inlet portion, the gasket portion having a generally tubular configuration with an outer surface, an inner surface, a top edge and a bottom edge interconnecting the surfaces thereof, the inlet portion having a generally tubular configuration positioned in axial alignment with the gasket portion, an inner surface, an outer surface, a top edge and a bottom edge interconnecting the surfaces thereof and with the bottom edge further coupled to the top edge of the gasket portion; and a metal screen having a bottom wall and a tubular peripheral side wall portion extended upwards from the bottom wall to define a hollow interior, a central opening to the interior, and an upper edge bounding the central opening and with the upper edge coupled to the gasket portion to thereby create an annular holding space for receiving a nozzle of a gas tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, the preferred embodiment of the new and improved in-tank fuel filter for a lawnmower embodying the principles and concepts of the present invention and generally designated by the reference number 10 will be described.

The present invention is comprised of a plurality of components. In their broadest context, such components include a tank inlet adapter and a metal screen. Such components are individually configured and correlated with respect to each other to provide the intended function of preventing debris and dirt from entering a fuel tank 12 of a lawnmower 14.

Figure 8:
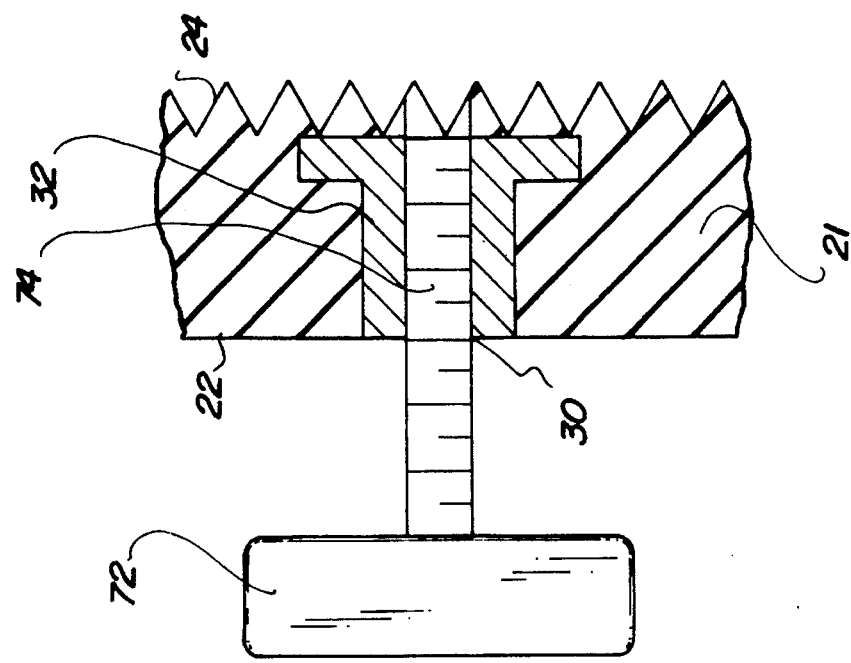
FIG. 8 is an enlarged view of the securement of the locking screw to the gasket of the present invention. The same reference numerals refer to the same parts through the various Figures.

Specifically, the present invention includes a tank inlet adapter 16. The tank inlet adapter has a lower annular gasket portion 18 formed of plastic and an upper tubular inlet portion 20 formed of rubber. The gasket portion has an exterior diameter greater than that of the inlet portion. The gasket portion has a generally tubular configuration and includes an outer wall 21 with a smooth outer surface 22 and a threaded inner surface 24. The gasket portion includes a top edge 26, a bottom edge 28, and an inner wall 29 extended downwards from the top edge 26 of the outer wall 21. The gasket also has a threaded bore 30 radially disposed through the outer wall as shown in FIG. 8. The bore is formed by a screw anchor 32.

Figure 3:
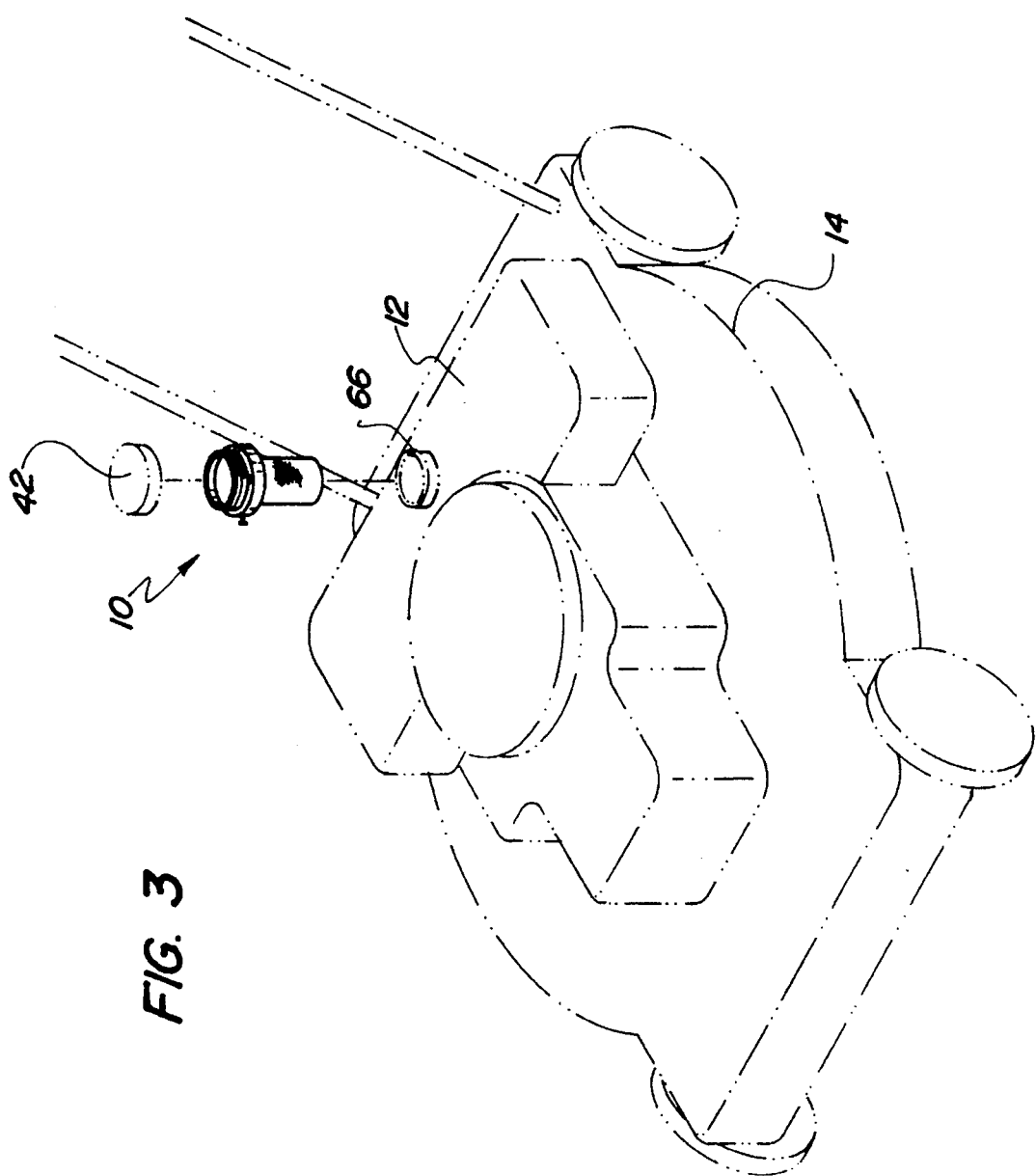
FIG. 3 is perspective view of the preferred embodiment constructed in accordance with the principles of the present invention.
Figure 5:
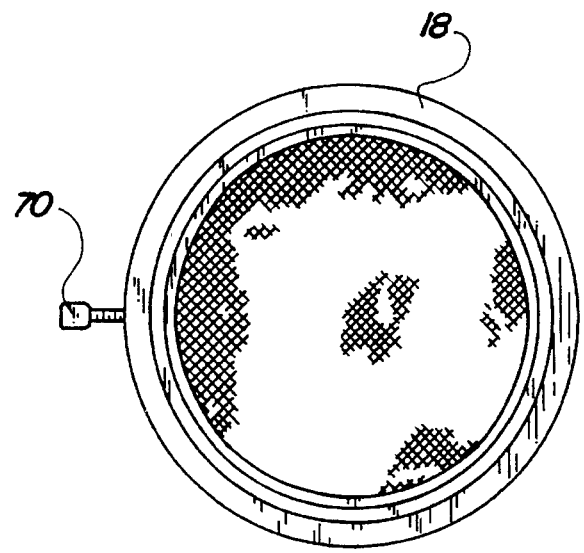
FIG. 5 is top plan view of the preferred embodiment of the present invention.
Figure 6:
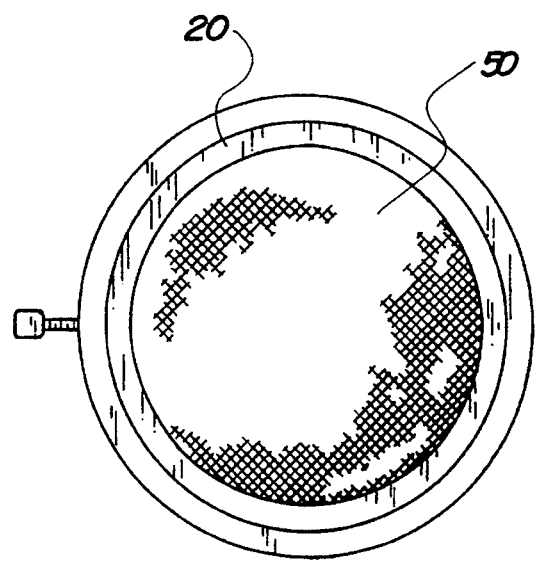
FIG. 6 is bottom plan view of the preferred embodiment of the present invention.
Figure 7:
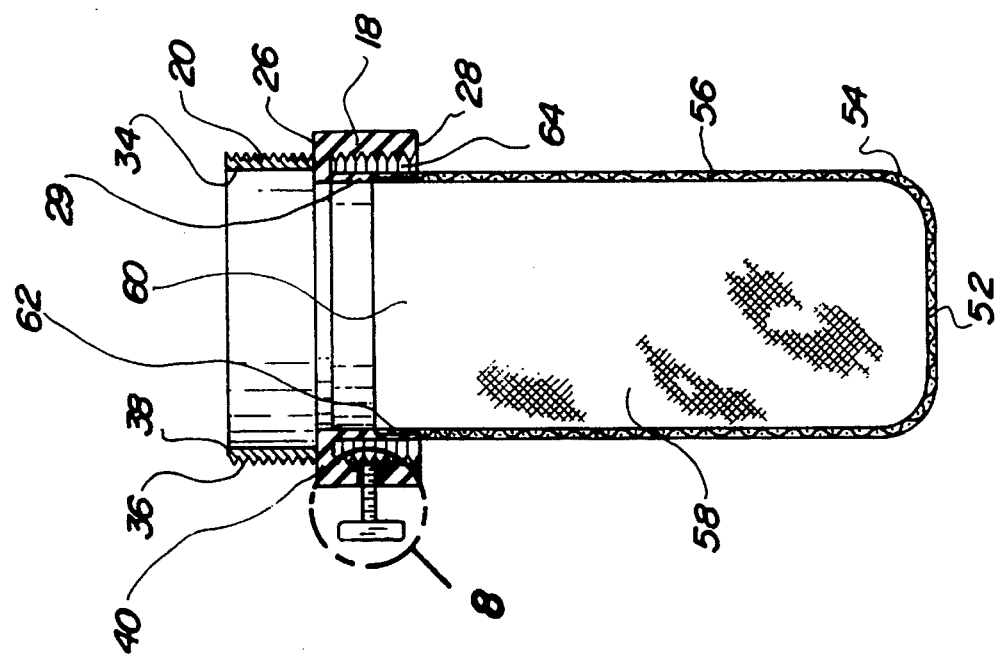
FIG. 7 is a cross sectional view of the present invention taken along the line 7—7 of FIG. 4.

The inlet portion 20 of the tank inlet adapter 16 has a generally tubular configuration. The inlet portion 20 is positioned in axial alignment with the gasket portion as shown in FIG. 7. The inlet portion has a smooth inner surface 34, a threaded outer surface 36, a top edge 38 and a bottom edge 40 interconnecting the surfaces thereof. The bottom edge further is coupled to the top edge 26 of the gasket portion 18. This securement between the portions may also be performed in an integral type manner. The inlet portion is securable to an inwardly threaded gas cap 42 of a lawnmower 14 at the top edge thereof as shown in FIG. 3.

Figure 2:
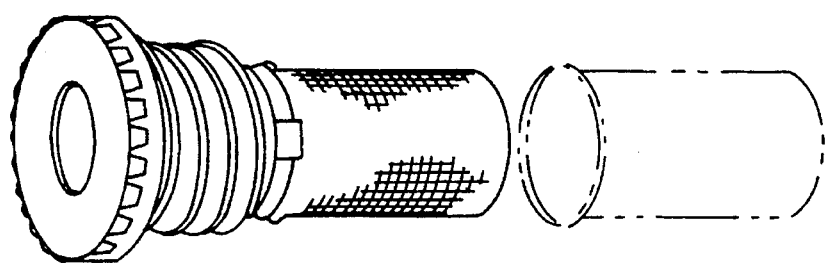
FIG. 2 is perspective view of a prior art self venting gas cap.
Figure 1:
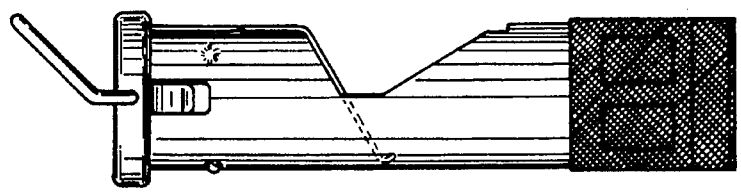
FIG. 1 is a side elevational view of a prior art fuel filtering device.
Figure 4:
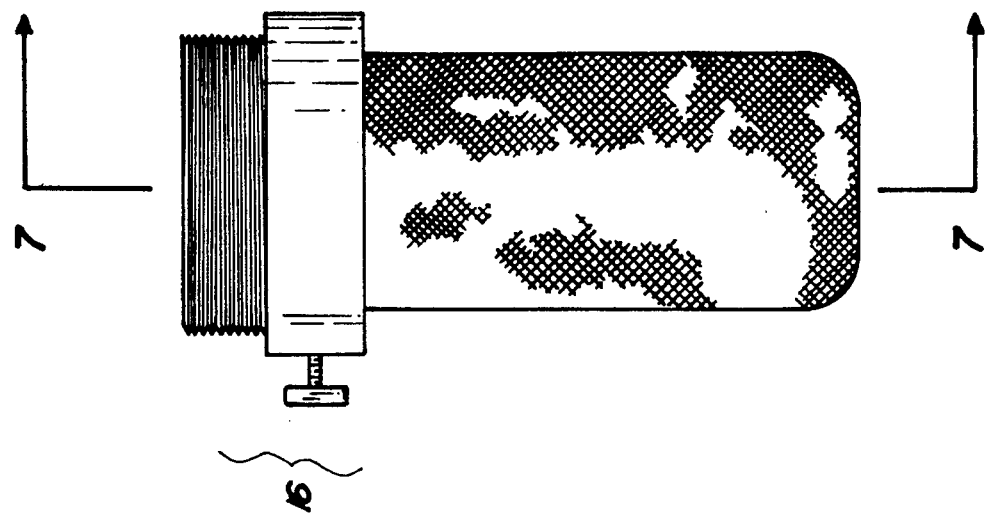
FIG. 4 is a side elevational view of the preferred embodiment of the present invention.

The present invention also includes a screen 50. The screen is formed of generally non-corrosive metal such as brass. The screen has a flat bottom wall 42, a tapered annular portion 54 extended upwards from the bottom wall, and a tubular peripheral side wall portion 56 extended upwards from the annular portion. The annular portion 56 allows a generally continuous connection between the side wall and bottom wall and thus allows for easy cleaning of the screen. The tubular side wall 56 defines a hollow interior 58, a central opening 60 into the interior, and an upper edge 62 bounding the central opening. The through holes formed by the crosshatched metal of the screen are of a dimension such as to trap dirt and other debris such as grass and the like yet allow fuel such as gasoline to readily pass through. The upper edge 62 of the screen is coupled to the gasket portion at the inner wall 29 thereof to thereby create an annular exteriorly positioned holding space 64 for receiving an outwardly threaded nozzle 66 of a gas tank 12 of the lawnmower as shown in FIG. 1. The side wall portion 56 of the screen further has a fixed interior diameter of a size to receive a standard-sized fuel nozzle like that on gas cans. In addition, the screen has an axial length twice that of the fixed interior diameter of the side wall portion 56, thus providing sufficient depth to the hollow interior for filling with fuel for filtering operations.

Lastly, a threaded rigid metal locking screw 70 is provided. The locking screw has a generally T-shaped handle 72 on one end and an elongated threaded portion 74 on the other end. The threaded portion 74 is threadedly disposed within the bore 30 of the tank adapter 16 and is radially inwardly extendable. The locking screw 70 is thus abuttable against a threaded nozzle 66 of a gas tank 12 when the nozzle is disposed within the holding space 64 and threadedly engaged with the inner surface 24 of the gasket portion 18.

The present invention is a small fuel filter designed to fit inside the tank inlet of a lawnmower near the nozzle thereof and prevent debris from falling into the gas tank. The present invention consists of a screen, a threaded adapter, and a locking screw. The screen is made from fine brass mesh and is an oblong shaped cylinder open at one end and is about 3 inches long and about 1½ inches in diameter. It is attached to a threaded tank inlet adapter that is about 1 inch long and about 1½ inches in diameter. The gasket portion has an axial length of about ½ inch and the inlet portion has an axial length of about ½ inch. The bottom half of the adapter is covered by a rubber gasket portion which is threaded on the inside. The inlet portion of the adapter is made of an impact-resistant plastic. A locking screw is located on the side of the gasket portion.

To operate with the present invention, remove the gas cap from the lawnmower, trimmer, or a similar device. Insert the present invention and screw it onto the threaded gas nozzle. Tighten the locking screw to make sure the present invention stays in place. The gasket portion of the adapter will prevent leakage around the connection. Once the present invention is in place, screw the gas cap onto the tank inlet portion. Whenever trash and debris become trapped in the filter, the filter can be readily removed and cleaned. The present invention thus prevents debris such as grass clippings, sand, and the like from entering the gas tank, fuel line, and engine and subsequently causing damage. The present invention eliminates costly repairs resulting from this damage and can be used again and again.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An in-tank fuel filter for preventing debris from entering a fuel tank of a lawnmower comprising, in combination:

a tank inlet adapter having a lower gasket portion and an upper inlet portion, the gasket portion having a generally tubular configuration and an outer wall with a smooth outer surface and a threaded inner surface, a top edge, a bottom edge, an inner wall extended downwardly from the top edge, and a threaded bore disposed on the outer wall, the inlet portion having a generally tubular configuration positioned in axial alignment with the gasket portion, a smooth inner surface, a threaded outer surface, a top edge and a bottom edge interconnecting the surfaces thereof with the bottom edge further coupled to the top edge of the gasket portion and with the inlet portion securable to an inwardly threaded gas cap of a lawnmower;

a metal screen having a flat bottom wall, a tapered annular portion extended upwards from the bottom wall, and a tubular peripheral side wall portion extended upwards from the annular portion to define a hollow interior, a central opening to the interior, and an upper edge bounding the central opening and with the upper edge coupled to the gasket portion at the inner wall thereof to thereby create an annular holding space for receiving an outwardly threaded nozzle of a gas tank, the side wall portion of the screen further having a fixed interior diameter, the screen further having an axial length twice that of the fixed interior diameter of the side wall portion; and a threaded locking screw having a handle on one end and a threaded portion on the other end and with the threaded portion threadedly disposed within the bore of the tank adapter and radially inwardly extendable for abutment against a threaded nozzle of a gas tank that is disposed within the holding space and threadedly engaged with the inner surface of the gasket portion.

\* \* \* \* \*